May 7, 1929.  D. PARRETT  1,712,162

TRACTOR

Filed July 26, 1926   2 Sheets-Sheet 1

INVENTOR.
Dent Parrett
BY
ATTORNEYS.

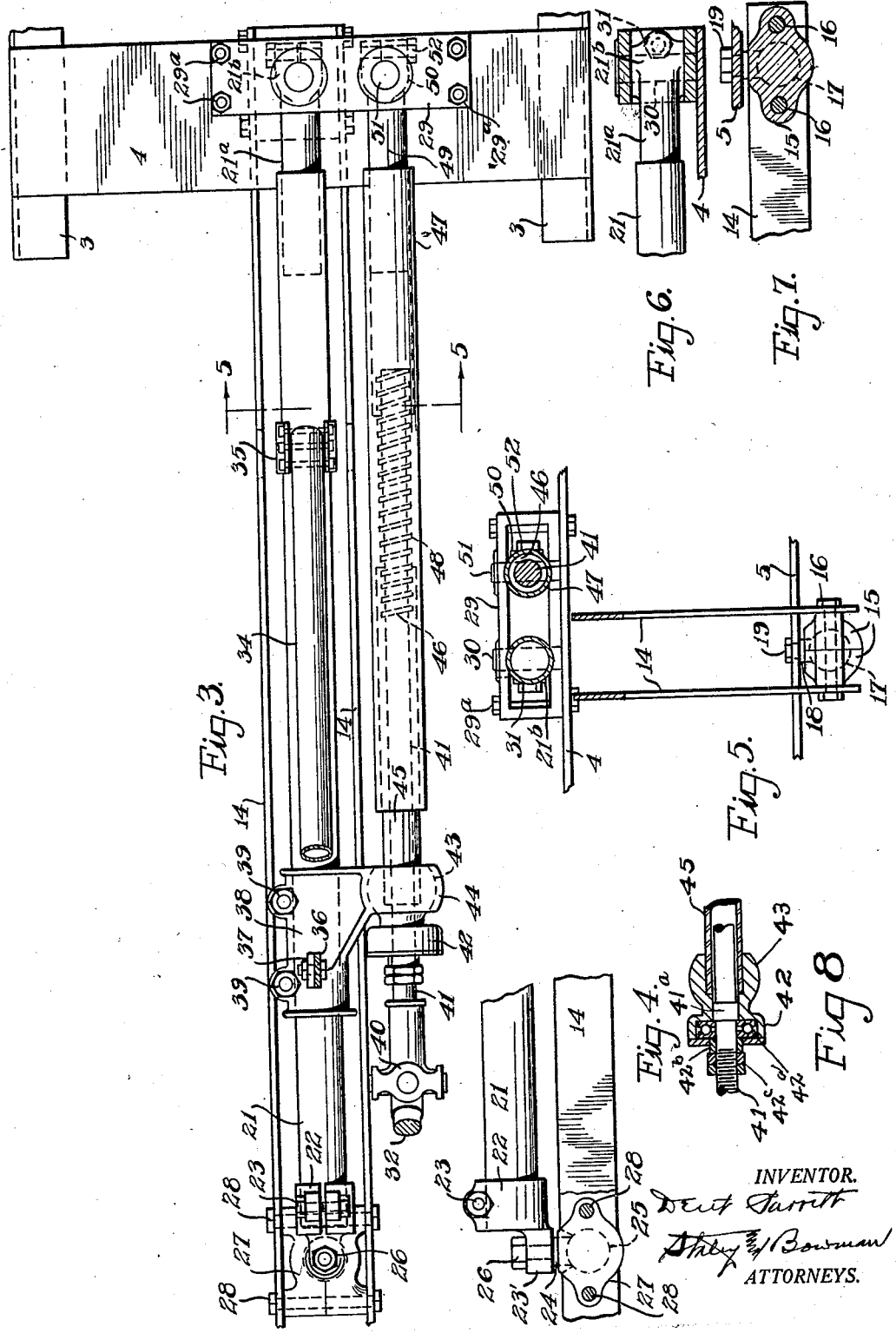

Patented May 7, 1929.

1,712,162

UNITED STATES PATENT OFFICE.

DENT PARRETT, OF SPRINGFIELD, OHIO.

TRACTOR.

Application filed July 26, 1926. Serial No. 124,807.

My invention relates to tractors, it more particularly relating to the devices for hitching an implement to the tractor.

The object of the invention is to provide a draft structure for hitching an implement to the tractor of a character which will lend great flexibility to the structure, but at the same time be rigid enough to take the torque or stress of the driving wheels, the draft sructure being particularly adapted for attaching an implement to a tractor of the two-wheel type.

A further object of the invention is to provide a coupling unit for connecting an implement with a tractor of such a nature as will permit horizontal movement of the implement relative to the tractor for steering purposes, and also relative vertical swinging movement of the tractor and implement to compensate for inequalities in the ground, with the coupling unit so connected to the implement that the implement and unit will swing bodily together to compensate for uneven travel so that the same relative position may be maintained between operating devices, such as the steering wheel on the coupling unit, and operating levers on the implement, to thereby prevent interference between such devices when the implement tilts relatively to the tractor or viceversa.

In the accompanying drawings:

Fig. 3 is a top plan view of the hitching devices and steering mechanism.

Fig. 4 is a side elevation of the connection between the draft member and its brace.

Fig. 5 is a section on the line 5—5 of Fig. 3.

Fig. 6 is a side elevation of the forward end of the brace rod, showing in section the block to which it is pivoted and the plate which supports the block.

Fig. 7 is a side elevation of the forward end of the draft member and its universal connection with the supporting plate, a portion of the plate being shown in section.

Fig. 8 is a detail in section of the thrust bearing for the steering shaft.

Figure 1:
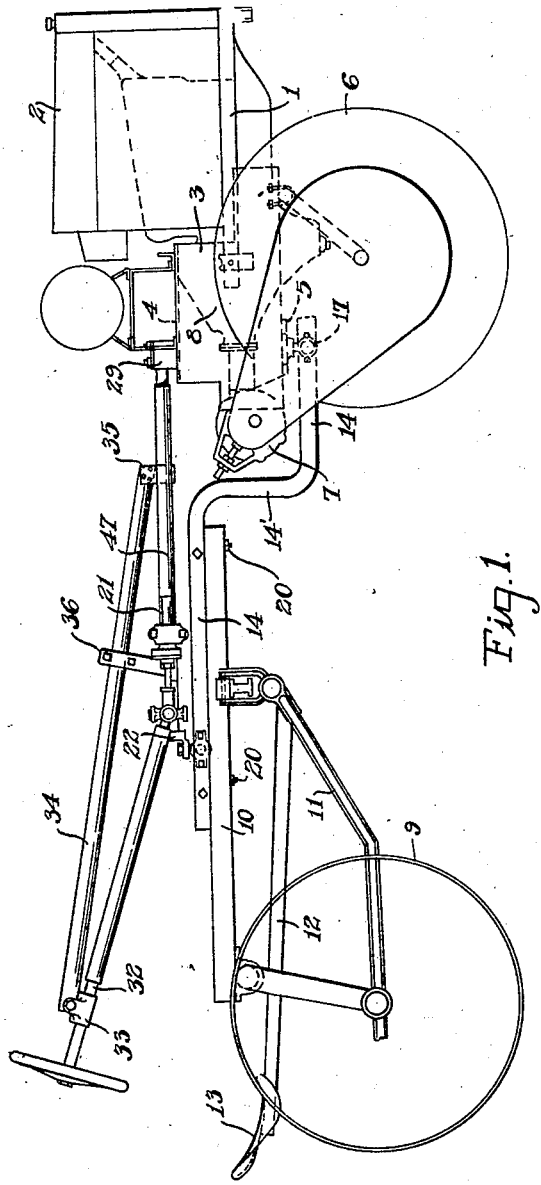
Fig. 1 is a side elevation of so much of a tractor and the implement to be drawn thereby as is necessary to explain my improvements.
Figure 2:
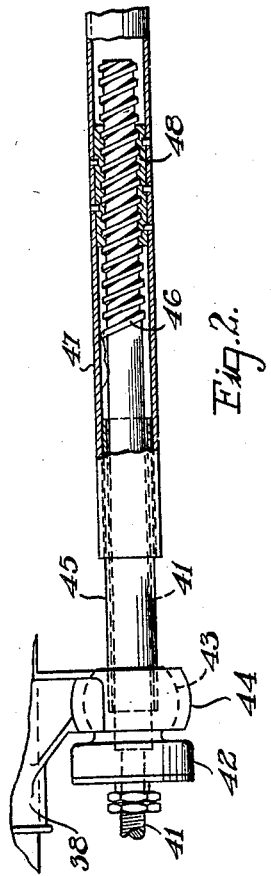
Fig. 2 is a top plan partly in section of a portion of the steering mechanism.

The tractor to which my improvements have been applied is similar to the one described in my pending application, Serial No. 755,131, filed December 11, 1924, 1 representing the main frame upon which the engine 2 is mounted and having side supporting members 3 which are connected by an upper supporting plate 4 and a lower supporting plate 5. The tractor is a twowheel affair, 6 representing one of the carrying wheels, the wheels being driven by chains from the differential mechanism mounted in the axle structure 7 which is closely connected with the transmission mechanism in the housing 8 in the manner more fully described in my pending application Serial No. 59,001, filed September 28, 1925.

The implement which is shown attached to the tractor in the present case is a cultivator, so much thereof being shown as is necessary to illustrate the improvements, 9 representing one of the carrying wheels, 10 the draft pole, 11 one of the cultivator beams and 12 the seat support carrying at its rear end the seat 13.

There is involved a coupling unit consisting of a draft member which is rigidly connected with the pole 10 and connected with the tractor by a universal connection, and also includes a brace connected with the draft member by a universal connection and connected with the tractor by a pivotal connection. The particular form of the draft member depends upon the implement which is to be attached to the tractor, but in the present case I have shown the draft member formed of two parallel bars 14 having the rear and forward ends projected in a horizontal direction and connected by an intermediate vertical portion 14' so that the rear ends may be in the present embodiment elevated to a higher plane than the forward ends to permit the attachment to the pole 10. The forward ends of the two draft bars are spaced by a two-part socket member 15 with the bars and socket member rigidly united by a pair of bolts 16 (Fig. 5). The spherical socket in the member 15 receives a ball 17 on the lower end of a stud 18 the upper end of which is reduced and threaded, the reduced end being received by an aperture in the bottom supporting plate 5 and clamped thereto by a nut 19 threaded thereon. The rear horizontal portions of the draft bars 14 are secured to the pole 10 by bolts 20, which pass through spacing blocks (not shown) secured between the bars and also through the pole.

The brace for the draft member is shown at 21, and is preferably of tubular form. Secured to the rear end of this brace is a split collar 22 (Figs. 3 and 4), the collar being clamped to the brace by a bolt 23. The collar 22 has an apertured ear 23′ to receive the reduced end of a stem 24 having formed on the lower end thereof a ball 25, a nut 26 threaded on the stem serving to securely fasten the stem and the ball to the ear. The rear ends of the draft bars 14 are spaced by a two-part socket member 27, the socket and bars 14 being secured together by the bolts 28. The spherical socket of this member 27 receives the ball 25. The forward end of the brace 21 has pressed therein a projecting shank 21ª, having at its forward end a split collar 21ᵇ which projects into a hollow open-sided block 29 which is secured by the bolts 29ª to the upper supporting plate 4. The collar 21ᵇ is clamped to a pivot pin 30 by the bolt 31; the ends of the pin projecting beyond the shank and being journaled in the upper and lower walls of the block 29. The vertical axis of this pin is in vertical alignment with the vertical axis of the ball 17.

As a result of this arrangement it will be seen that the forward end of the draft member 14 is connected with the tractor frame by a universal joint and that the brace 21 therefor is connected with the draft member by a universal joint and also has a pivotal connection with the tractor frame; this pivotal connection being in vertical alignment with the universal connection of the draft member with the tractor frame. By such an arrangement the relative movement between the implement and tractor due to uneven travel is about an axis which is inclined to the horizontal and represented by a line passing centrally through both of the ball and socket connections.

This arrangement not only connects the tractor and implement rigidly together against relative vertical swinging movement, but permits the tractor and implement to have the relative lateral movement necessary for steering, and also permits either side of the tractor or the implement to rise or drop in passing over obstructions or depressions and thus eliminate tortional stresses. This arrangement also permits the parts to accommodate themselves to the position of the tractor when one of its wheels is on plowed ground and the other wheel running on unplowed ground or any other conditions which may be met with in the travel of the tractor and implement. The brace 21 acts to brace the draft member against stress due to the torque of the drive wheels, the tendency of which is to depress the forward end of the draft bar 14.

By reason of the fact that the steering unit is rigidly connected to the implement and then so connected with the tractor as to permit of the necessary relative movement between the implement and tractor for steering purposes and to compensate for uneven travel, it will be noted that when either side of the implement rises, the steering unit will move bodily with it so that there will be no interference between the steering wheel mounted on the unit and the operating levers associated with the implement as would be the case where there was relative movement between the implement and the rear end of the coupling unit. In arrangements of the latter kind, trouble has been experienced with the operating levers of the implement striking the steering wheel, since it is necessary to have the steering wheel placed at a point within convenient reach of the operator sitting on the seat of the implement and also have the operating levers associated with the implement likewise located. This interference often results in pinching the hand of the operator between the implement lever and the steering wheels and in breakage of parts. By the arrangement described this difficulty is completely overcome because of the fact that the steering unit and tongue of the implement are rigidly connected together and therefore must swing bodily together so that the same relative distance is maintained between the implement operating levers and the steering wheel.

A rear steering shaft 32 is journaled in a bearing 33 carried at the rear end of a support 34; this support being fastened at its forward end to a clip 35 secured to the brace 21 and being braced by a bar 36 which is bolted to an ear 37 on a sleeve 38, secured to the brace member 21 by the bolts 39. The forward end of the steering shaft 32 is connected through a universal joint 40 to a second forward shaft 41. The rear end of this shaft 41 has an integral collar or enlargement 41ª which is journaled in the forward end wall of a housing 42 within which is located a ball thrust bearing indicated at 42ª which cooperates with the collar 41ª and with a short sleeve 42ᵇ held in position by the nuts 42ᶜ (Fig. 8). This bearing housing 42 is formed integrally with a rounded head 43 which is clamped in a similarly formed socket in a two-part clamp 44, one-half of which is integrally connected with the sleeve 38. A sleeve member 45 has its rear end pressed into the bore of the head 43 with a tight fit and projects forwardly to form a guide. The shaft 41 projects forwardly loosely through the head 43 and sleeve 45 and has its forward end provided with screw-threads 46. A sleeve-like member 47 has its rear end mounted upon the guide 45 and is also provided with an interally threaded portion or nut 48 engaged with the threads of the shaft 41. The forward end of this sleeve 47 has a shank 49, the forward end of which is provided with a split collar 50 which is clamped to a pivot pin 51 by a bolt 52 (Fig. 5); the pivot pin having its ends projecting beyond the sleeve and journaled in the upper and lower walls of the block 29 eccentrically to the connection between the tractor frame and draft member 14 and its brace 21. The shaft 41 is immovable longitudinally by reason of the thrust bearing in the housing 42 so that when the shaft 42 is turned, the sleeve member 47 is moved forwardly or rearwardly which acts to turn the tractor wheels 6 in the desired direction to steer the structure.

Further, it will be noted that the steering devices are supported by the draft appliances so that in connecting an implement with a tractor it is only necessary to connect the draft member 14 thereto. This draft member 14 will be suitably formed for convenient attachment to the implement whether it be a cultivator, as shown, or a corn planter, or other ground breaking, cultivating or seed planting implement.

Having thus described my invention, I claim:

1. The combination, with a two-wheeled tractor structure and an implement structure, of a draft member, means for connecting same respectively to the implement and tractor structures, and a brace with means for connecting same to the draft member and the tractor structure, all of said connecting means being of a character to support the tractor by the implement and permit relative lateral swinging movement of said implement and tractor structures and also permit relative movement thereof to compensate for uneven travel, but at the same time to prevent relative lateral swinging movement between the draft member and the implement structure.

2. The combination, with a two-wheeled tractor structure and an implement structure, of a draft member rigidly connected with said implement structure and having a universal connection with said tractor structure, and a brace member having a universal connection with said draft member and a pivotal connection with said tractor structure, said pivotal connection being in vertical alignment with the connection between said draft member and tractor structure.

3. The combination, with a two-wheeled tractor structure and an implement structure, of a draft member rigidly attached to said implement structure, a ball and socket connection between said draft member and said tractor structure, a brace member, a ball and socket connection between said brace member and said draft member, and a pivotal connection having a vertical axis between said brace member and said tractor structure in vertical alignment with the vertical axis of the ball and socket connection between said draft member and said tractor structure.

4. The combination, with a two-wheeled tractor structure and an implement structure, of a draft member connected to said structures, the connection being such as to permit relative lateral swinging movement of said structures and also relative movement to eliminate tortional stresses due to uneven travel of the structures, and a brace member connecting the draft member and tractor structure arranged to permit the aforesaid relative movements of said tractor and implement structures and resist the torque of the tractor structure in all relative positions of the two structures.

5. The combination, with a two-wheel tractor structure and an implement structure, of a draft member connecting said structures, the connection with said tractor structure being of a universal character to permit relative lateral swinging movements of said structures and also relative movements due to uneven travel, and a brace member connecting the draft member and tractor structures, the connection of the brace member with the draft member being a universal one and with the tractor structure a pivotal one, the pivotal connection of said brace member with said tractor structure being above and in vertical alignment with the connection of said tractor structure with said draft member, whereby said brace member resists the torque of the drive wheels but permits the aforesaid relative movements between said tractor and implement structure.

6. The combination, with a two-wheel tractor and an implement, of a coupling unit for connecting said tractor and implement consisting of a draft member and a brace member extending between the draft member and tractor and having a direct connection with said draft member, means for connecting said coupling unit with said implement, and means for connecting said coupling unit with said tractor such that said implement and coupling unit may move bodily together relatively to said tractor to compensate for uneven travel.

7. The combination, with a two-wheel tractor and an implement, of a coupling unit for connecting said tractor and implement consisting of a draft member and a brace member extending between the draft member and tractor and having a direct connection with said draft member, means for connecting said coupling unit with said implement, and means for connecting said coupling unit with said tractor such that said implement and coupling unit may move bodily together relatively to said tractor to compensate for uneven travel, such movement being about an axis inclined to a horizontal plane.

8. The combination, with a two-wheel tractor and an implement to be drawn thereby, of a two-part coupling unit, means for connecting the rear end of one member of said unit rigidly with the implement, a universal connection for connecting the forward end of said member with the tractor, means for pivotally connecting the forward end of the companion member of said unit with said tractor, and means for connecting the two members of said unit at or near their rear ends by a universal connection.

9. The combination, with a two-wheel tractor and an implement to be drawn thereby, of a two-part coupling unit, one member of said coupling unit being of Z-form with the forward end relatively low and the rear end relatively high, means for connecting the rear end of said member rigidly with said implement, a universal connection between the forward end of said member and said tractor, means for connecting the forward end of the companion member of said unit with said tractor to permit the same to move horizontally relative to said tractor, and means for connecting the rear portions of said members by a universal connection.

In testimony whereof, I have hereunto set my hand this 20th day of July, 1926.

DENT PARRETT.